Patented Mar. 10, 1936

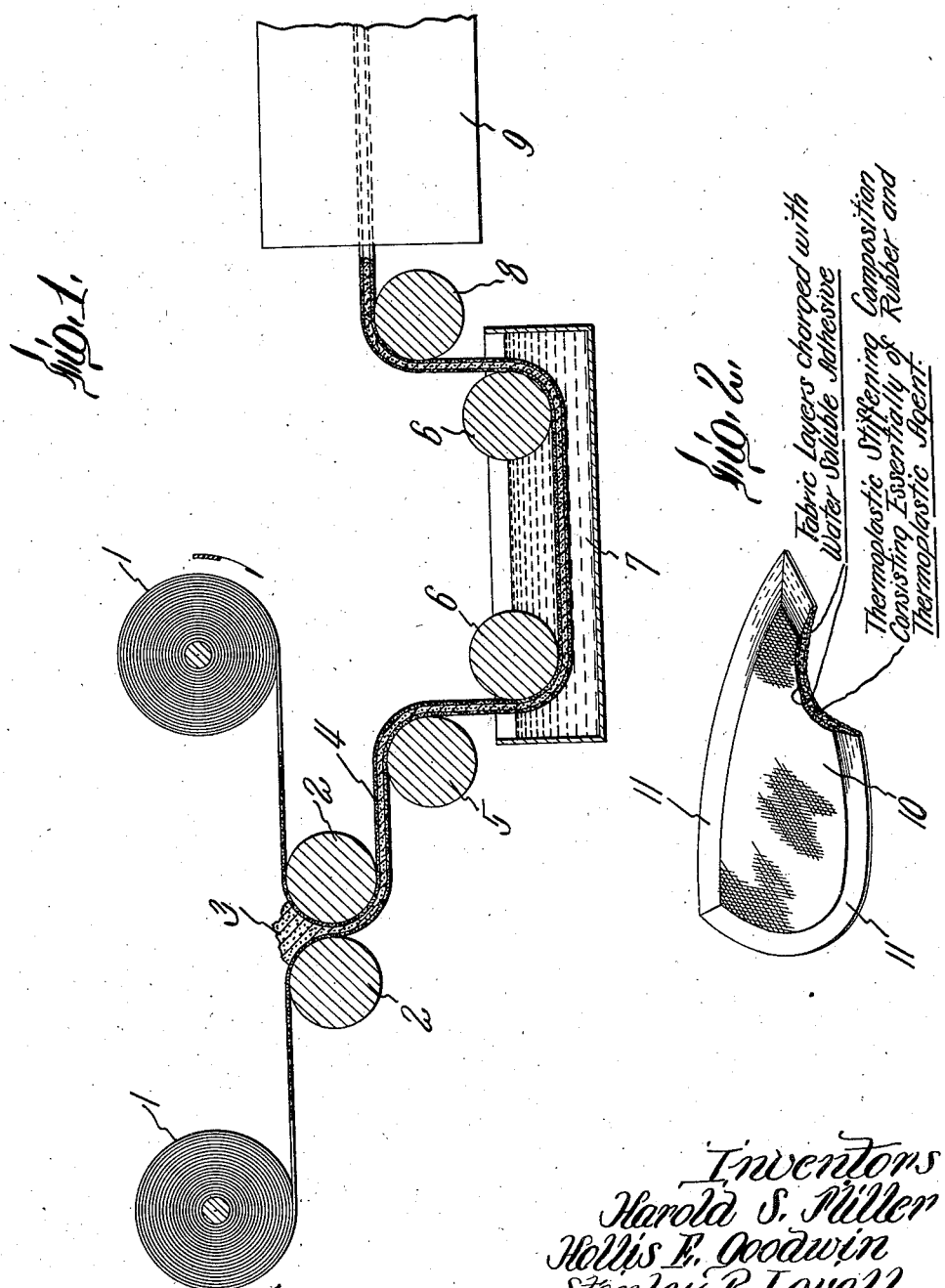

2,033,727

UNITED STATES PATENT OFFICE 2,033,727

BOX TOE

Harold S. Miller, Quincy, Hollis E. Goodwin, Belmont, and Stanley P. Lovell, Newton, Mass., assignors to Beckwith Manufacturing Company, Boston, Mass., a corporation of Massachusetts Application October 15, 1932, Serial No. 637,882

4 Claims. (Cl. 154—46)

This invention relates to the manufacture of shoe stiffeners, and more especially box toes of the so-called thermoplastic variety. Box toes of this general character are usually conditioned for assembly with the shoe upper, by exposure to moist heat or steam in so-called box toe steamers, wherein they acquire the desired limpness and mouldability for incorporation into the shoe upper immediately prior to the pulling-over and lasting operations, which conform them to the shape of the last, whereupon they are permitted to set or harden in such shape.

In application Serial No. 522,794, filed March 14, 1931, by Harold S. Miller, there is disclosed a box toe of a thermoplastic character made up of a textile fabric backing on which a thermoplastic composition consisting essentially of both rubber and a thermoplastic agent, preferably Montan wax, is placed as an adherent layer, furnishing the desired qualities of stiffness, flexibility, and resiliency to the box toe at normal temperature conditions. When the thermoplastic composition is compounded with such proportions of rubber and thermoplastic agent as will impart what may be termed a semi-soft condition to the box toe, there is little tendency for the layer of composition to separate or break away from the fabric base, even when the box toe is subjected to considerable flexing. On the other hand, when the stiffening composition contains sufficient wax or other thermoplastic agents to impart to the box toe a high degree of hardness and stiffness, it is found that the layer of composition tends to break and slough off from the fabric backing, especially when the box toe is flexed on an arc which places the unsupported surface of the layer under tension. In other words, the thermoplastic composition is of insufficient tenacity to maintain itself as a coherent layer under flexing at normal temperatures.

In accordance with the present invention, we produce a thermoplastic box toe wherein a layer of stiffening composition made up essentially of thermoplastic agent or essentially of rubber and a thermoplastic agent, preferably Montan wax, is confined between two flexible sheet backings, preferably of woven textile fabric, so that even when such a composition is compounded with a view toward imparting a high degree of stiffness and hardness to the box toe, there is little tendency for the layer of stiffening composition to break away by virtue of its anchorage to backings on both faces. In other words, the backings conduce to a non-shatterable condition in the composition, no matter in what direction the stiffener is flexed.

We proceed substantially as follows when the stiffener is to be one characterized by a high degree of stiffness and hardness comporting well with use in various types of shoes. To begin with, we take 100 pounds of smoked sheet or equivalent kind of rubber and subject it to breaking down on the usual type of rubber mill. When the rubber has reached the desired plasticized condition, we compound therewith on the rubber mill about 200 pounds by weight of Montan wax or equivalent thermoplastic agent. Of course, this compounding of the rubber and thermoplastic agent could be effected in an internal rubber mixer, e. g., one of the Banbury or Werner and Pfleiderer type. While this mixing operation is going on or after it has been concluded, we preferably add to the mixture any suitable bulking or filling agent in suitable amount. For example, we may add about 200 parts by weight of asbestos fiber, wood flour, or the like. Should cork dust be selected as the filler, a lower proportion need be used, on account of the low apparent specific gravity of cork. In the case of cork, we would use a volume of cork dust corresponding to that of the asbestos fiber or wood flour. If desired, zinc oxide may be compounded with the rubber in comparatively small amount, say 1 part by weight, along with other rubber-compounding agents, such as sulphur, accelerators of vulcanization, etc., for the purpose of modifying the physical properties of the rubber. It is to be observed that we use a distinctly preponderant proportion of thermoplastic agent, as this yields a composition which is quite stiff and hard at normal temperature conditions. Montan wax, when used in amount twice that of the rubber, yields a comparatively hard and stiff composition, on account of the hard, brittle nature of this wax at normal temperature conditions. A stiffening composition compounded as hereinbefore described lends itself to spreading on suitable backings through the usual calendering operation. In actual practice, we maintain such compositions as a bank on a pair of calender rolls while feeding progressively two suitable sheets, preferably textile fabric, into the nip of the rolls so as to receive the composition as an inner layer of the desired thickness therebetween. Preferably, the textile fabric employed is of comparatively coarse weave, so as to furnish openings or meshes of a size ensuring a firm anchorage of the layer of stiffening composition thereto. Thus, we may advantageously employ so-called "Osnaberg" fabric having a yarn count of "32—28", i. e., 32 warp threads and 28 weft threads, to the inch. It is, however, possible to use a cotton, duck, or twill of comparatively coarse weave.

The plied, stiffened sheet produced as hereinbefore described is preferably treated on either or both faces with a suitable water-soluble adhesive before it is cut into box toe blanks. Such an adhesive is rendered sticky under the influence of the moist heat to which the box toe blanks are subjected prior to their assembly with shoe uppers. While it is possible to use various kinds of water-soluble adhesives, including glue, we find it preferable to treat the fabric layers with an uncooked starch solution. We have found that when uncooked starch is deposited in the fabric and then subjected to steaming treatment, the starch becomes cooked and yields in situ in the fabric a viscous adhesive, which is not leached from the fabric and does not migrate under the action of such water vapor as may condense on the box toe blanks while they are being steamed. While we may use a plain solution of raw starch, we prefer to add thereto a suitable proportion of dextrine or other water-soluble adhesive, on account of the fact that the raw starch itself would, after drying, tend to be released as a dust from the fabric. The starch composition which we employ may be one prepared by adding 50 pounds of finely granulated tapioca or potato starch in raw condition to 20 pounds of a 30% solution of water-soluble adhesive, such as dextrine derived from tapioca. The dextrine serves the function of fixing the raw starch granules to the fabric, so that they do not tend to shed from the fabric as a dust. We preferably employ raw tapioca or potato starch, for the reason that these starches tend to yield, upon cooking, adhesive solutions of higher viscosity than those prepared from other raw starches. The starch composition preferably contains a suitable preservative, such as beta naphthol, which inhibits putrefaction or moulding of the starchy materials. The starch composition may be applied in any suitable way, as by spraying or coating onto the fabric, or by immersing the plied, stiffened sheet in a bath of the composition. The water-soluble adhesive thus furnished on either or both faces of the stiffener makes it possible to attach the stiffener to either or both the shoe upper and the shoe lining, wherefore, the stiffener, once put in the shoe, will tend to remain integrated with the shoe upper.

On the accompanying drawing,

Figure 1 illustrates diagrammatically and conventionally instrumentalities which we may employ in making our plied, stiffened sheet.

Figure 2 shows in perspective our finished box toe blank, partially broken away and appropriately legended to indicate its component elements.

As shown in Figure 1, two rolls of fabric I are simultaneously unwound and progressively fed in opposite directions into the nip of a pair of calender rolls 2. These rolls are rotated at the same speed but in opposite directions, and clear each other sufficiently to permit the stiffening composition of the character described to be calendered in between the fabric sheets as a uniform layer of the desired thickness, the pressure of calendering being all that is necessary to cause the layer to be enmeshed by the fabric sheets. The stiffening composition may be constantly kept as a bank or supply 3 at the flared entrance to the nip of the rolls, so that a plied, stiffened sheet will progressively issue from the rolls as fabric is being fed thereto. The sheet 4 may be conducted over the guide roll 5 under the roll 6 maintained partially submerged in a bath 7 of adhesive solution such as already described. The outer fabric plies of the sheet thus become charged with a solution of water-soluble adhesive. Upon emerging from the bath 7, the sheet may be passed over a guide roll 8 and into a drier 9 of any suitable design. The dried sheet may then be cut into box toe blanks 10, which, as shown in Figure 2, may be skived at their marginal edges 11, as ordinarily.

It is possible to use flexible sheets other than woven ones, such as felts or papers reinforced, if desired, with rubber or other binding agent, leather, cellophane, etc., as backings for the stiffening composition, but we prefer to use a woven textile fabric, because it affords a backing which is not only resistant to tearing and other physical stress, but to which the stiffening composition becomes firmly anchored by enmeshment and which permits of the desired degree of stretching when the box toe blank in its limp and mouldable condition is going through the lasting and pulling-over operations along with the shoe upper. The thermoplastic agent used with the rubber in the stiffening composition may be asphalt, rosin, wax, cumar, artificial resins, or mixtures of such substances, which undergo softening or fluxing under the application of only moderate heat, such as that furnished by live steam, and which quickly set at normal temperature conditions to a solid condition. In the case of hard, stiff box toes, such as we are desirous of producing, the thermoplastic agent should be used in an amount distinctly in excess of the rubber. Montan wax can be used to advantage as the only thermoplastic agent, in an amount about twice that of the rubber, to yield, as hereinbefore described, a stiffening composition which functions to impart to the stiffener of the present invention a high degree of hardness and stiffness. Aside from the function of the outer, flexible sheet backings in keeping the layer of thermoplastic composition confined therebetween so that there is little tendency for it to break away under bending or flexing action, they serve the purpose of enhancing the over-all stiffness of the box toe blanks. In the case of woven textile fabrics or other sheet backings which have been coated or charged with a water-soluble adhesive, such as starch, as hereinbefore described, the water-soluble adhesive enhances the stiffness of the fabric and, being substantially unaffected by temperature changes, such as would soften the intermediate layer of thermoplastic composition, is of further value in rendering the toe portion of the finished shoe containing the moulded box toe blank resistant to deformation under the action of direct solar heat or under exposure to warm atmospheres, such as would cause more or less softening of the intermediate thermoplastic layer.

We claim:

1. A box toe blank capable of being rendered limp and mouldable under moist heat, comprising a backing of flexible sheet material to which is anchored a continuous, calendered layer of thermoplastic composition containing rubber, said backing being charged with raw starch granules.

2. A box toe blank capable of being rendered limp and mouldable under moist heat, comprising a backing of flexible sheet material to which is anchored a continuous, calendered layer of thermoplastic composition containing rubber, said backing being charged with raw starch granules affixed thereto by another water-soluble adhesive.

3. A box toe blank capable of being rendered limp and moldable under moderate heat, comprising outer fabric backings carrying therebetween a calendered layer of a thermoplastic stiffening composition containing rubber, the fabric backings being of sufficiently coarse mesh to ensure firm anchorage thereto of the calendered layer of thermoplastic stiffening composition.

4. A box toe blank capable of being rendered limp and moldable under moderate heat, comprising outer fabric backings carrying therebetween a calendered layer of a thermoplastic stiffening composition containing rubber, the fabric backings being of sufficiently coarse mesh to ensure firm anchorage thereto of the calendered layer of thermoplastic stiffening composition and at least one of said backings being charged with a water-soluble adhesive that undergoes adhesive activation under moist heat.

HAROLD S. MILLER.
HOLLIS E. GOODWIN.
STANLEY P. LOVELL.